United States Patent
Jung et al.

(10) Patent No.: US 9,213,132 B2
(45) Date of Patent: Dec. 15, 2015

(54) DIRECTIONAL BACKLIGHT UNIT

(71) Applicant: ELECTRONICS AND TELECOMMUNICATIONS RESEARCH INSTITUTE, Daejeon (KR)

(72) Inventors: Soo Yong Jung, Gwangju (KR); Sei Hyoung Lee, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 78 days.

(21) Appl. No.: 14/231,265

(22) Filed: Mar. 31, 2014

(65) Prior Publication Data

US 2015/0205032 A1    Jul. 23, 2015

(30) Foreign Application Priority Data

Jan. 20, 2014    (KR) .......................... 10-2014-0006677

(51) Int. Cl.
*F21V 7/04*     (2006.01)
*F21V 8/00*     (2006.01)
*G02B 27/22*    (2006.01)

(52) U.S. Cl.
CPC ............ *G02B 6/0031* (2013.01); *G02B 6/0025* (2013.01); *G02B 27/22* (2013.01)

(58) Field of Classification Search
CPC ..... G02B 6/0031; G02B 6/0025; G02B 27/22
USPC .............. 362/607, 608, 97.1, 97.2, 97.3, 97.4
See application file for complete search history.

(56) References Cited

U.S. PATENT DOCUMENTS

| | | | |
|---|---|---|---|
| 8,154,686 B2 | 4/2012 | Mather et al. | |
| 2007/0273810 A1* | 11/2007 | Lee et al. | 349/65 |
| 2009/0115937 A1* | 5/2009 | Guo et al. | 349/65 |
| 2009/0190070 A1* | 7/2009 | Nagata et al. | 349/65 |
| 2010/0053497 A1* | 3/2010 | Nagata et al. | 349/61 |
| 2011/0211142 A1 | 9/2011 | Kashiwagi et al. | |
| 2011/0285927 A1 | 11/2011 | Schultz et al. | |
| 2012/0314145 A1 | 12/2012 | Robinson | |

* cited by examiner

*Primary Examiner* — Anh Mai
*Assistant Examiner* — Glenn Zimmerman
(74) *Attorney, Agent, or Firm* — Rabin & Berdo, P.C.

(57) ABSTRACT

Provided is a directional backlight unit that enables a three-dimensional (3D) image to be viewed at various viewing angles. The directional backlight unit includes a light source configured to emit light, a first reflector configured to reflect light emitted from the light source, a second reflector configured to additionally reflect the light reflected by the first reflector, a light guide plate configured to accommodate the light reflected by the first reflector or the second reflector and output the light to an outside, and an angle adjustor configured to rotate the first reflector or the second reflector to a reflective angle. The angle adjustor rotates the first reflector or the second reflector to change an incident angle of the light incident on the light guide plate and a refractive angle of the light output to the outside.

17 Claims, 5 Drawing Sheets

DIRECTIONAL BACKLIGHT UNIT

CROSS-REFERENCE TO RELATED APPLICATIONS

This application claims priority under 35 U.S.C. §119 to Korean Patent Application No. 10-2014-0006677, filed on Jan. 20, 2014, the disclosure of which is incorporated herein by reference in its entirety.

TECHNICAL FIELD

The present invention relates to a directional backlight unit, and more particularly, to a directional backlight unit that enables a three-dimensional (3D) image to be viewed at various viewing angles.

BACKGROUND

A backlight unit denotes a unit in which a light guide plate uniformly irradiates light, emitted from a light source, onto an entire surface of a display panel.

The backlight unit is generally applied to televisions (TVs) and monitors.

Recently, technology that enables a viewer to view a 3D image even without wearing glasses is being developed.

In a related art backlight unit, a zone that enables a 3D image to be viewed is fixed by a device, and thus, a viewer's eyes are located in a specific zone so as to view a 3D image.

However, if the viewer moves from the specific zone, the view's eyes deviate from the specific zone, and for this reason, the 3D image is broken.

PRIOR ART REFERENCE

Patent Document

US 2011/0285927A

SUMMARY

Accordingly, the present invention provides a directional backlight unit that enables a 3D image to be transferred to zones in various directions depending on the case without transferring the 3D image to only a fixed specific zone.

In one general aspect, a directional backlight unit includes: a light source configured to emit light; a first reflector configured to reflect light emitted from the light source; a second reflector configured to additionally reflect the light reflected by the first reflector; a light guide plate configured to accommodate the light reflected by the first reflector or the second reflector, and output the light to an outside; and an angle adjustor configured to rotate the first reflector or the second reflector to a reflective angle, wherein the angle adjustor rotates the first reflector or the second reflector to change an incident angle of the light incident on the light guide plate and a refractive angle of the light output to the outside.

The angle adjustor may include: a first angle adjustor configured to rotate the first reflector in a direction of the light guide plate; and a second angle adjustor configured to rotate the second reflector in the direction of the light guide plate.

The second reflector may be disposed more adjacent to the light source than the first reflector. A through hole, through which the light emitted from the light source passes, may be formed at the second reflector, and the light emitted from the light source may pass through the through hole, and may be irradiated onto the first reflector.

The first and second reflectors may be disposed at both sides on the light guide plate to be separated from each other.

The second reflector may include a first planar reflector configured to reflect the light reflected by the first reflector and a second planar reflector configured to additionally reflect the light reflected by the first planar reflector. The first planar reflector and the second planar reflector may be disposed at both sides on the light guide plate to be separated from each other. The light guide plate may accommodate the light reflected by the first planar reflector or the second planar reflector, and output the light to the outside. The angle adjustor may rotate the first planar reflector or the second planar reflector to adjust a reflective angle, thereby changing the incident angle of the light incident on the light guide plate.

The angle adjustor may include: a first angle adjustor configured to rotate the first planar reflector in the direction of the light guide plate; and a second angle adjustor configured to rotate the second planar reflector in the direction of the light guide plate.

The angle adjustor may include: a second angle adjustor configured to rotate the first planar reflector in the direction of the light guide plate; and a third angle adjustor configured to rotate the second planar reflector in the direction of the light guide plate.

The first planar reflector may be disposed more adjacent to the light source than the first reflector and the second planar reflector. A through hole, through which the light emitted from the light source passes, may be formed at the first planar reflector, and the light emitted from the light source passes through the through hole, may be irradiated onto the first reflector, and reflected to the first planar reflector.

The first reflector may include a reflection surface formed in a concave arc shape, and the second reflector may include a reflection surface formed in a planar shape.

The reflection surface of the first reflector may have an arc shape which is long formed in a lateral direction, and the light passing through the through hole may be widely irradiated in the lateral direction corresponding to the reflection surface of the first reflector.

The directional backlight unit may further include a light diffuser configured to widely diffuse the light, emitted from the light source, in the lateral direction, wherein the light diffuser may be disposed between the light source and the second reflector, and may widely diffuse the light, emitted from the light source, in the lateral direction to allow the light to pass through the through hole.

The directional backlight unit may further include a light thickness adjustor configured to adjust a thickness of the light emitted from the light source, wherein, as the incident angle of the light incident on the light guide plate increases, the light thickness adjustor may increase the thickness of the light.

The light guide plate may include: a total reflection surface configured to totally reflect light incident on an inside; and an output surface configured to transmit some of light to the outside, and reflect the other light to the total reflection surface. A transmittance of the output surface may increase progressively farther away from an incident point of light on the light guide plate.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

First Embodiment

Figure 1:
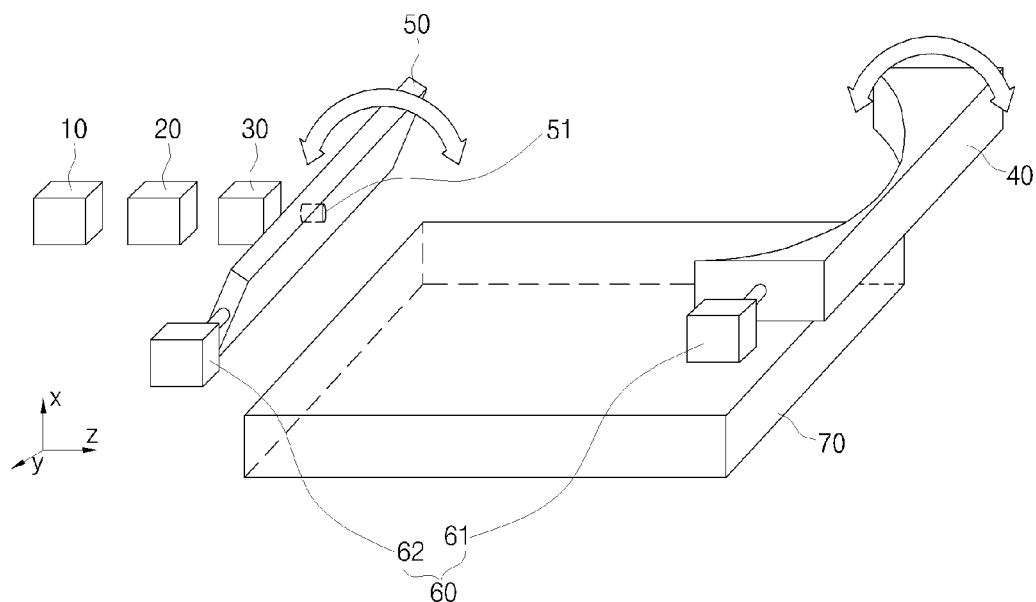
FIG. 1 is a view illustrating a schematic configuration of a directional backlight unit according to a first embodiment of the present invention.
Figure 2:
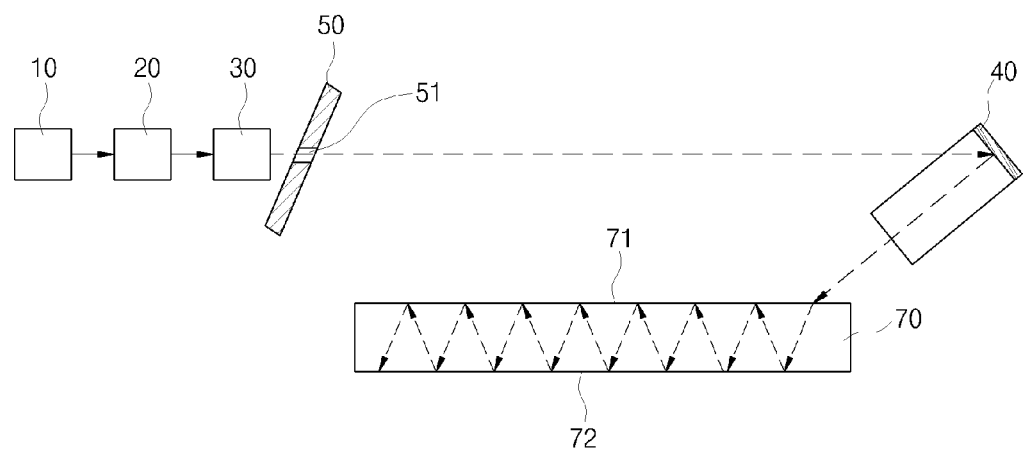
FIG. 2 is a side view illustrating an operation of irradiating light onto a light guide plate through a first reflection surface, in the directional backlight unit according to the first embodiment of the present invention.
Figure 3:
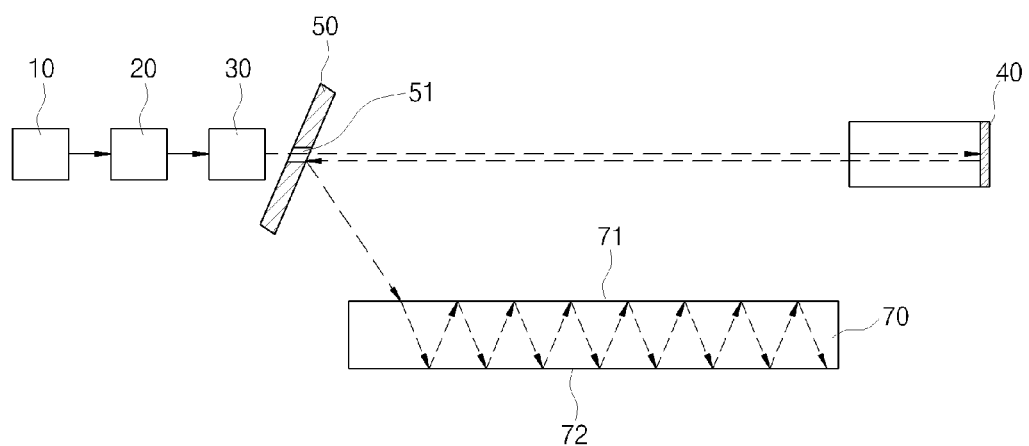
FIG. 3 is a side view illustrating an operation of irradiating light onto the light guide plate through a second reflection surface, in the directional backlight unit according to the first embodiment of the present invention.
Figure 4:
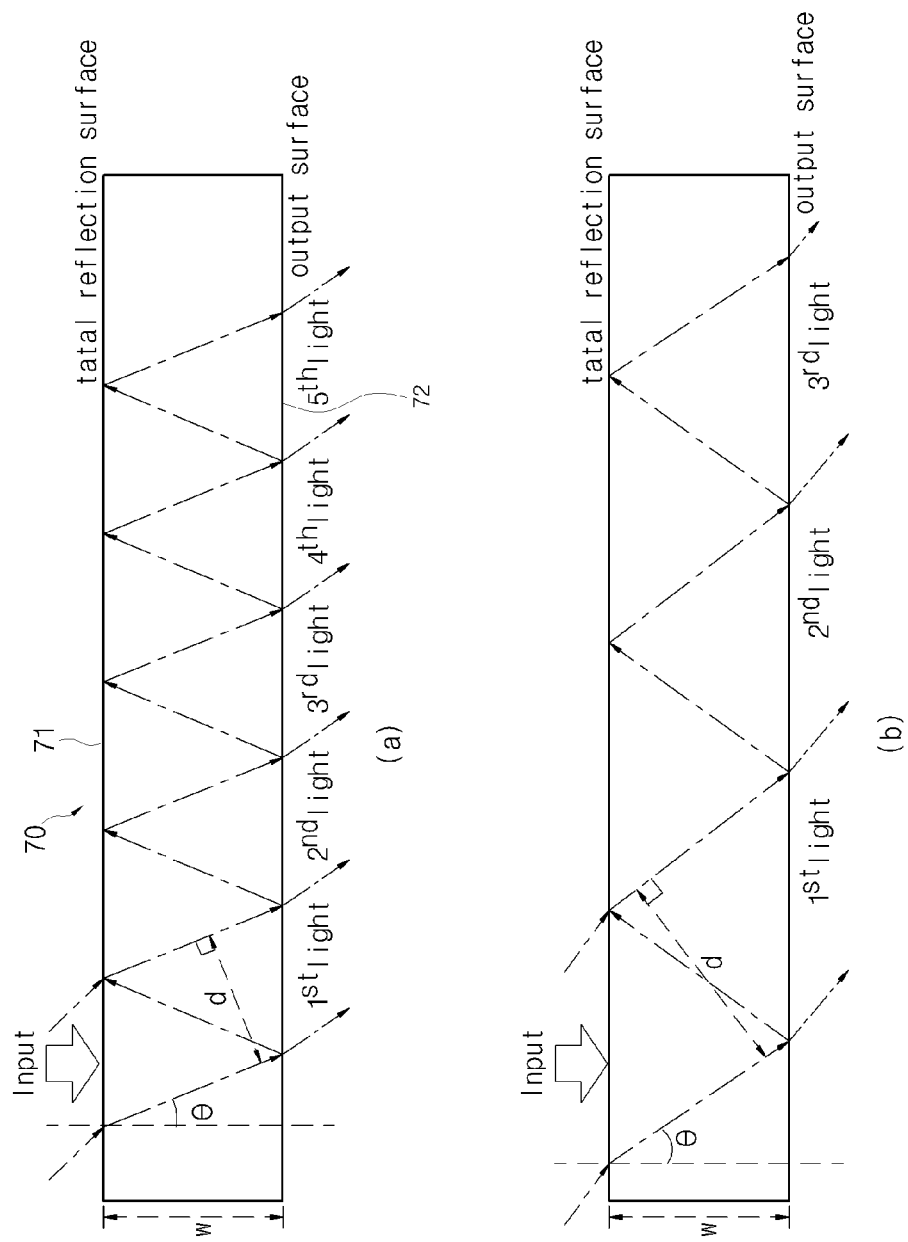
FIG. 4 is views for describing light incident on the light guide plate of the directional backlight unit according to the first embodiment of the present invention.

FIG. 1 is a view illustrating a schematic configuration of a directional backlight unit according to a first embodiment of the present invention. FIG. 2 is a side view illustrating an operation of irradiating light onto a light guide plate through a first reflection surface, in the directional backlight unit according to the first embodiment of the present invention. FIG. 3 is a side view illustrating an operation of irradiating light onto the light guide plate through a second reflection surface, in the directional backlight unit according to the first embodiment of the present invention. FIG. 4 is views for describing light incident on the light guide plate of the directional backlight unit according to the first embodiment of the present invention.

As illustrated in FIGS. 1 to 3, the directional backlight unit according to the first embodiment of the present invention includes a light source 10, a light thickness adjustor 20, a light diffuser 30, a first reflector 40, a second reflector 50, an angle adjustor 60, and a light guide plate 70.

The light source 10 emits light, and may use all elements that emit light.

The light thickness adjustor 20 adjusts a thickness of the light emitted from the light source, and the thickness of the light is changed by the light thickness adjustor 20 depending on the case.

The light thickness adjustor 20 is known technology. For example, the light thickness adjustor 20 may adjust a distance between adjacent lenses among a plurality of lenses, or may be configured with a varifocal lens or the like.

The light diffuser 30 widely diffuses the light, which is emitted from the light source 10 and has a thickness changed by the light thickness adjustor 20, in a lateral direction.

In FIG. 1, the light diffuser 30 widely diffuses the light in a Y-axis direction (i.e., the lateral direction) while maintaining a thickness of the light in an X-axis direction as-is.

The first reflector 40 directly receives the light which is widely diffused in the lateral direction by the light diffuser 30.

The first reflector 40 is formed in an arc shape in which a reflection surface is long recessed in the lateral direction.

Therefore, the light which is widely diffused in the lateral direction by the light diffuser 30 is reflected by the reflection surface of the first reflector 40 having the arc shape, and thus, an angle of the light is changed, whereby the light has the same width in the lateral direction.

That is, the light which is widely diffused in the lateral direction by the light diffuser 30 is reflected by the reflection surface of the first reflector 40, and thus is changed to light which has the same width in the lateral direction.

The second reflector 50 additionally reflects the light reflected by the first reflector 40, thereby allowing the light to be transferred to the light guide plate 70.

The second reflector 50 includes a reflection surface which is formed in a planar shape, and is separated from the first reflector 40. The second reflector 50 is disposed more adjacent to the light source 10 (in detail, the light diffuser 30) than the first reflector 40.

A through hole 51, through which the light emitted from the light source 10 (in detail, the light diffused by the light diffuser 30) passes, is formed at the second reflector 50.

Therefore, as illustrated in FIGS. 2 and 3, the light diffused by the light diffuser 30 passes through the through hole 51, and is irradiated onto the reflection surface of the first reflector 40.

The light passing through the through hole 51 is widely irradiated in a lateral direction corresponding to the reflection surface of the first reflector 40.

The first and second reflectors 40 and 50 are disposed at both sides on the light guide plate 70 to be separated from each other.

Therefore, based on a reflective angle of each of the first and second reflectors 40 and 50, the light diffused by the light diffuser 30 may be directly reflected by the first reflector 40 and irradiated onto the light guide plate 70, or may be reflected by the first and second reflectors 40 and 50 and irradiated onto the light guide plate 70.

The angle adjustor 60 rotates the first reflector 40 and/or the second reflector 50 in a direction of the light guide plate 70 to adjust the reflective angle.

In the present embodiment, the angle adjustor 60 includes a first angle adjustor 61, which rotates the first reflector 40 in a direction where the light guide plate 70 is disposed, and a second angle adjustor 62 that rotates the second reflector 50 in the direction where the light guide plate 70 is disposed.

The angle adjustor 60 is configured with a motor or the like, and rotates the first reflector 40 and/or the second reflector 50 to adjust the reflective angle.

The first reflector 40 or the second reflector 50 is rotated by the angle adjustor 60, and thus, an incident angle of light incident on the light guide plate 70 and a refractive angle of light output to the outside are changed.

The light guide plate 70 accommodates the light reflected by the first reflector 40 and/or the second reflector 50, and outputs the light to the outside.

In the present embodiment, the light guide plate 70 is disposed under the first reflector 40 and the second reflector 50, and accommodates light irradiated in an upper direction to output the light in a lower direction.

The light guide plate 70 includes a total reflection surface 71, which totally reflects light incident on the inside, and an output surface 72 that transmits some of light to the outside and reflects the other light to the total reflection surface 71.

In the present embodiment, the total reflection surface 71 is disposed on the light guide plate 70, and the output surface 72 is disposed under the light guide plate 70.

In this case, light which is incident on the light guide plate 70 through an upper portion of the light guide plate 70 is incident on the inside of the light guide plate 70 without being reflected.

A transmittance of the output surface 72 increases progressively farther away from an incident point of light on the light guide plate 70.

Therefore, luminance is uniformly shown in a whole area of the output surface 72 of the light guide plate 70.

The transmittance of the output surface 72 of the light guide plate 70 is easily adjusted by applying a voltage.

Moreover, as an incident angle "θ" of the light incident on the light guide plate 70 increases, the light thickness adjustor 20 adjusts a thickness of the light to be increased.

This can be seen in FIG. 4.

That is, in of FIG. 4(a), it is shown that when an incident angle of light is small, a thickness of the light is small. In of FIG. 4(b), it is shown that when the incident angle of the light is large, the thickness of the light is large.

Such a light thickness is expressed as an equation "d=2w sin θ" illustrated in FIG. 4.

Here, w denotes a thickness of the light guide plate 70, and θ denotes an angle (i.e., an incident angle) between light and a vertical axis in the light guide plate 70.

In addition, an angle (i.e., a refractive angle) of light output into the air is expressed as "$\sin^{-1}(n \cdot \sin \theta)$" according to Snell's law. Here, n denotes a refractive index of the light guide plate 70.

For example, when the thickness of the light guide plate 70 is 1 mm, the refractive index of the light guide plate 70 is 1.46, and the incident angle "θ" is 20 degrees, a desired light size (i.e., a light thickness) is 0.68 mm, in which case a direction of light output from the light guide plate 70 is refracted by about 30 degrees.

An operation of the directional backlight unit according to the present invention having the above-described configuration will be described.

The thickness of the light emitted from the light source 10 is adjusted by the light thickness adjustor 20, and the thickness-adjusted light is widely diffused in the lateral direction by passing through the light diffusor 30.

The light passing through the light diffusor 30 passes through the through hole 51 which is formed at the second reflector 50, and is irradiated onto the reflection surface of the first reflector 40.

When the light is incident on one end (which is adjacent to the first reflector 40) of both ends of the light guide plate 70, as illustrated in FIG. 2, the first angle adjustor 61 rotates the first reflector 40 in a down direction where the light guide plate 70 is disposed.

Then, the light reflected by the reflection surface of the first reflector 40 is directly incident on the inside of the light guide plate 70 through a top of the one end of the light guide plate 70.

In this case, the reflection surface of the first reflector 40 is formed in an arc shape in the lateral direction, and thus, when the reflected light is incident on the other end (which is adjacent to the second reflector 40) of the both ends of the light guide plate 70, as illustrated in FIG. 3, the light reflected by the reflection surface of the first reflector 40 is irradiated onto the second reflector 50.

Here, the light reflected by the first reflector 40 has a left width and a right width which are the same, and is irradiated onto the second reflector 50.

In FIG. 3, as seen from a side surface, the light reflected by the first reflector 40 is illustrated as being input to only the through hole 51, but is substantially irradiated in a left direction and a right direction of the second reflector 50.

Then, the second angle adjustor 62 rotates the second reflector 50 in the down direction where the light guide plate 70 is disposed.

The light, which is reflected by the first reflector 40 and is irradiated onto the second reflector 50, is additionally reflected by the second reflector 50, and is directly incident on the inside of the light guide plate 70 through a top of the other end of the light guide plate 70.

Some of the light incident on the inside of the light guide plate 70 is output to the outside through the output surface 72 which is disposed under the light guide plate 70. The other light is reflected to on the light guide plate, and is additionally reflected in a direction of the output surface 72 through the total reflection surface 71.

Through such a reflecting process, the light is output to the outside through the whole area of the output surface 72 which is disposed under the light guide plate 70.

In this case, the transmittance of the output surface 72 increases progressively farther away from an incident point of the light, and thus, luminance is uniformly shown in the whole area of the output surface 72 of the light guide plate 70.

As described above, the present invention adjusts the angle of each of the first and second reflectors 40 and 50 to freely irradiate light in a direction desired by a user through the light guide plate 70, thus enabling a plurality of viewers to easily view a 3D image at various viewing angles.

In this case, a separate sensor for sensing a viewer's position may be provided.

Moreover, since light is not irradiated onto an undesired zone, power is greatly saved, and when a plurality of viewers simultaneously view a 3D image, by adjusting an angle of light, the viewers can view different images.

Second Embodiment

Figure 5:
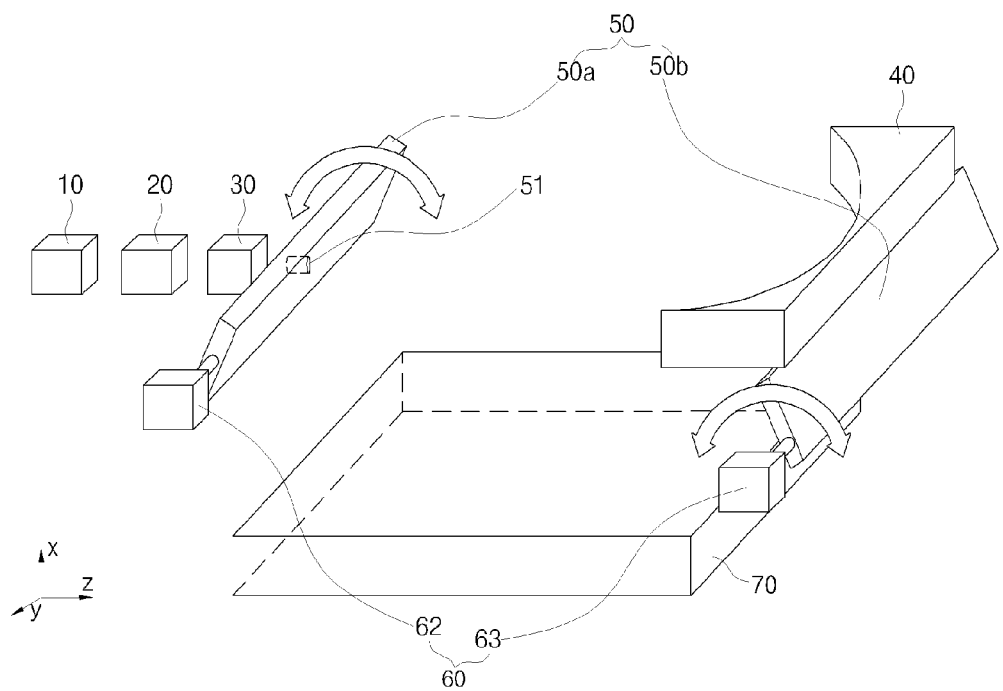
FIG. 5 is a view illustrating a schematic configuration of a directional backlight unit according to a second embodiment of the present invention.
Figure 6:
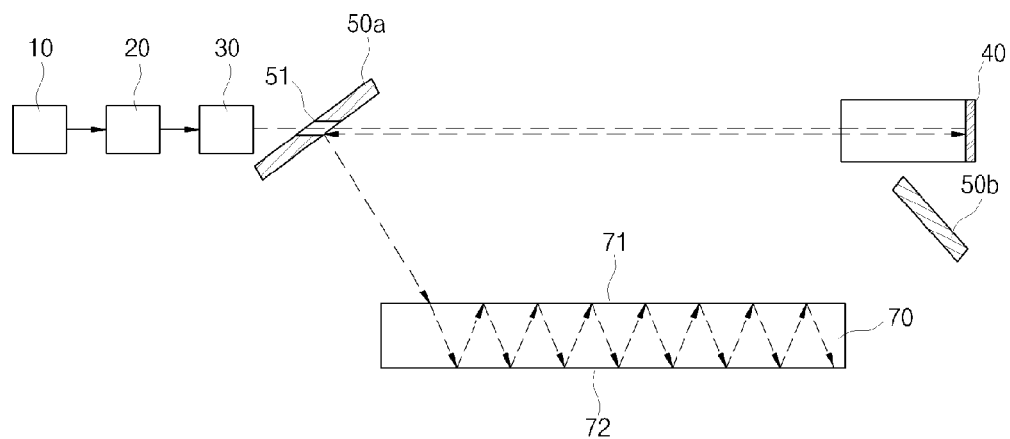
FIG. 6 is a side view illustrating an operation of irradiating light onto a light guide plate through a first reflection surface, in the directional backlight unit according to the second embodiment of the present invention.
Figure 7:
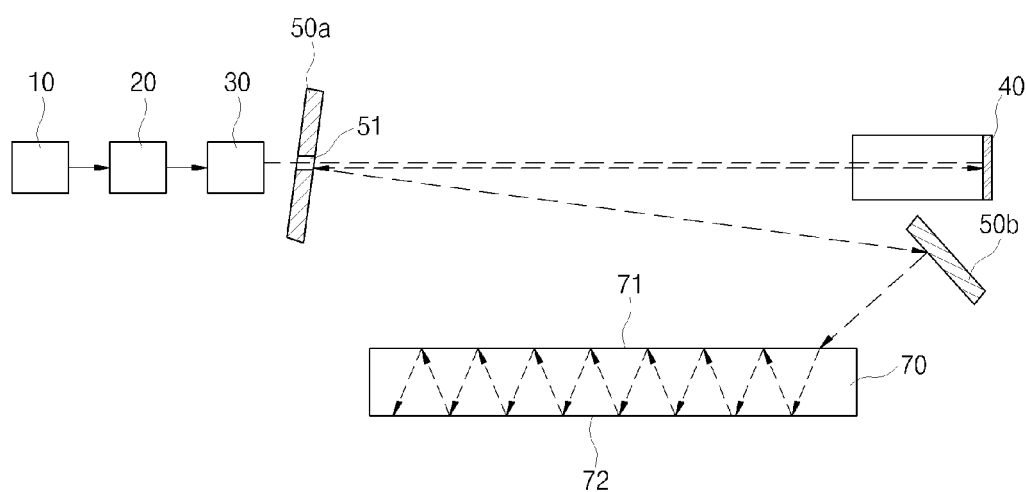
FIG. 7 is a side view illustrating an operation of irradiating light onto the light guide plate through a second reflection surface, in the directional backlight unit according to the second embodiment of the present invention.

FIG. 5 is a view illustrating a schematic configuration of a directional backlight unit according to a second embodiment of the present invention. FIG. 6 is a side view illustrating an operation of irradiating light onto a light guide plate through a first reflection surface, in the directional backlight unit according to the second embodiment of the present invention. FIG. 7 is a side view illustrating an operation of irradiating light onto the light guide plate through a second reflection surface, in the directional backlight unit according to the second embodiment of the present invention.

As illustrated in FIGS. 5 to 7, the directional backlight unit according to the second embodiment of the present invention includes a light source 10, a light thickness adjustor 20, a light diffuser 30, a first reflector 40, a second reflector 50, an angle adjustor 60, and a light guide plate 70.

In comparison with the first embodiment, the first reflector 40, the second reflector 50, and the angle adjustor 60 according to the second embodiment have differences. Thus, the following description will focus on the differences.

In comparison with the first reflector 40 according to the first embodiment, the second reflector 40 according to the second embodiment has the same shape, but is fixed without rotating.

The second reflector 50 additionally reflects the light reflected by the first reflector 40, thereby allowing the light to be transferred to the light guide plate 70. In the present embodiment, the second reflector 50 is configured with a first planar reflector 50a and a second planar reflector 50b.

The first planar reflector 50a and the second planar reflector 50b are disposed at both sides on the light guide plate to be separated from each other.

In the present embodiment, the second planar reflector 50b is disposed under the first reflector 40, but depending on the case, the second planar reflector 50b and the first reflector 40 may be disposed at different positions.

The first planar reflector 50a includes a reflection surface which is formed in a planar shape, and is separated from the first reflector 40. The first planar reflector 50a is disposed more adjacent to the light source 10 (in detail, the light diffuser 30) than the first reflector 40 and the second planar reflector 50b.

The first planar reflector 50a reflects light, reflected by the first reflector 40, to the light guide plate 70 or the second planar reflector 50b.

The second planar reflector 50b includes a reflection surface which is formed in a planar shape, and reflects light, reflected by the first reflector 40, to the light guide plate 70.

A through hole 51, through which the light emitted from the light source 10 (in detail, the light diffused by the light diffuser 30) passes, is formed at the first planar reflector 50a.

Therefore, as illustrated in FIGS. 6 and 7, the light diffused by the light diffuser 30 passes through the through hole 51, is irradiated onto the reflection surface of the first reflector 40, and is reflected to the first planar reflector 50a.

At this time, the light irradiated onto the first planar reflector 50a is directly irradiated onto the light guide plate 70, or is irradiated onto the second planar reflector 50b and is irradiated onto the light guide plate 70.

Therefore, based on a reflective angle of each of the first planar reflector 50a and the second planar reflector 50b, the light diffused by the light diffuser 30 may be directly reflected by the first planar reflector 50a and irradiated onto the light guide plate 70, or may be reflected by the first planar reflector 50a and the second planar reflector 50b and irradiated onto the light guide plate 70.

The angle adjustor 60 rotates the first planar reflector 50a and/or the second planar reflector 50b in a direction of the light guide plate 70 to adjust a reflective angle of the light incident on the light guide plate.

In the present embodiment, the angle adjustor 60 includes a second angle adjustor 62, which rotates the first planar reflector 50a in a direction where the light guide plate 70 is disposed, and a third angle adjustor 63 that rotates the second planar reflector 50b in the direction where the light guide plate 70 is disposed.

The angle adjustor 60 is configured with a motor or the like, and rotates the first planar reflector 50a and/or the second planar reflector 50b to adjust the reflective angle.

The first planar reflector 50a or the second planar reflector 50b is rotated by the angle adjustor 60, and thus, an incident angle of light incident on the light guide plate 70 and a refractive angle of light output to the outside are changed.

In the drawings according to the present embodiment, the angle adjustor 60 is illustrated as including the second and third angle adjustors 62 and 63, but may be configured with only the second angle adjustor 62 without the third angle adjustor 63.

In this case, the second planar reflector 50b is fixedly disposed to be inclined in the direction of the light guide plate 70.

Therefore, by rotating the first planar reflector 50a by using the second angle adjustor 62, light reflected to the first planar reflector 50a is irradiated onto the light guide plate 70, or is reflected and irradiated onto the light guide plate 70 by the second planar reflector 50b which is fixed to be inclined.

The light guide plate 70 accommodates the light reflected by the first planar reflector 50a or the second planar reflector 50b, and outputs the light to the outside.

The other details are similar to the first embodiment, and thus, their detailed descriptions are not provided.

According to the second embodiment, the present invention adjusts the angle of the first planar reflector 50a and/or the second planar reflector 50b to freely irradiate light in a direction desired by a user through the light guide plate 70, thus enabling a plurality of viewers to easily view a 3D image at various viewing angles.

As described above, the directional backlight unit adjusts the angle of each of the first and second reflectors to freely irradiate light in a direction desired by a user through the light guide plate, thus enabling a plurality of viewers to easily view a 3D image at various viewing angles instead of a fixed specific zone.

Moreover, since light is not irradiated onto an undesired zone, power is greatly saved, and when a plurality of viewers simultaneously view a 3D image, by adjusting an angle of light, the viewers can view different images.

The directional backlight unit according to the present invention is not limited to the above-described embodiments, and may be corrected and modified within the technical scope obvious to those skilled in the art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A directional backlight unit comprising:
   a light source configured to emit light;
   a first reflector configured to reflect light emitted from the light source;
   a second reflector configured to additionally reflect the light reflected by the first reflector;
   a light guide plate configured to accommodate the light reflected by the first reflector or the second reflector, and output the light to an outside; and
   an angle adjustor configured to rotate the first reflector or the second reflector to a reflective angle,
   wherein the angle adjustor rotates the first reflector or the second reflector to change an incident angle of the light incident on the light guide plate and a refractive angle of the light output to the outside.

2. The directional backlight unit of claim 1, wherein the angle adjustor comprises:
   a first angle adjustor configured to rotate the first reflector in a direction of the light guide plate; and
   a second angle adjustor configured to rotate the second reflector in the direction of the light guide plate.

3. The directional backlight unit of claim 1, wherein,
   the second reflector is disposed more adjacent to the light source than the first reflector,
   a through hole, through which the light emitted from the light source passes, is formed at the second reflector, and
   the light emitted from the light source passes through the through hole, and is irradiated onto the first reflector.

4. The directional backlight unit of claim 1, wherein the first and second reflectors are disposed at both sides on the light guide plate to be separated from each other.

5. The directional backlight unit of claim 1, wherein,
the second reflector comprises a first planar reflector configured to reflect the light reflected by the first reflector and a second planar reflector configured to additionally reflect the light reflected by the first planar reflector,
the first planar reflector and the second planar reflector are disposed at both sides on the light guide plate to be separated from each other,
the light guide plate accommodates the light reflected by the first planar reflector or the second planar reflector, and outputs the light to the outside, and
the angle adjustor rotates the first planar reflector or the second planar reflector to adjust a reflective angle, thereby changing the incident angle of the light incident on the light guide plate.

6. The directional backlight unit of claim 1, further comprising a light thickness adjustor configured to adjust a thickness of the light emitted from the light source,
wherein, as the incident angle of the light incident on the light guide plate increases, the light thickness adjustor increases the thickness of the light.

7. The directional backlight unit of claim 1, wherein,
the light guide plate comprises:
a total reflection surface configured to totally reflect light incident on an inside; and
an output surface configured to transmit some of light to the outside, and reflect the other light to the total reflection surface, and
a transmittance of the output surface increases progressively farther away from an incident point of light on the light guide plate.

8. The directional backlight unit of claim 3, wherein,
the first reflector comprises a reflection surface formed in a concave arc shape, and
the second reflector comprises a reflection surface formed in a planar shape.

9. The directional backlight unit of claim 8, wherein,
the reflection surface of the first reflector has an arc shape which is long formed in a lateral direction, and
the light passing through the through hole is widely irradiated in the lateral direction corresponding to the reflection surface of the first reflector.

10. The directional backlight unit of claim 9, further comprising a light diffuser configured to widely diffuse the light, emitted from the light source, in the lateral direction,
wherein the light diffuser is disposed between the light source and the second reflector, and widely diffuses the light, emitted from the light source, in the lateral direction to allow the light to pass through the through hole.

11. The directional backlight unit of claim 3, wherein the first and second reflectors are disposed at both sides on the light guide plate to be separated from each other.

12. The directional backlight unit of claim 5, wherein the angle adjustor comprises:
a first angle adjustor configured to rotate the first planar reflector in the direction of the light guide plate; and
a second angle adjustor configured to rotate the second planar reflector in the direction of the light guide plate.

13. The directional backlight unit of claim 5, wherein the angle adjustor comprises:
a second angle adjustor configured to rotate the first planar reflector in the direction of the light guide plate; and
a third angle adjustor configured to rotate the second planar reflector in the direction of the light guide plate.

14. The directional backlight unit of claim 5, wherein,
the first planar reflector is disposed more adjacent to the light source than the first reflector and the second planar reflector,
a through hole, through which the light emitted from the light source passes, is formed at the first planar reflector, and
the light emitted from the light source passes through the through hole, is irradiated onto the first reflector, and is reflected to the first planar reflector.

15. The directional backlight unit of claim 14, wherein,
the first reflector comprises a reflection surface formed in a concave arc shape, and
the second reflector comprises a reflection surface formed in a planar shape.

16. The directional backlight unit of claim 15, wherein,
the reflection surface of the first reflector has an arc shape which is long formed in a lateral direction, and
the light passing through the through hole is widely irradiated in the lateral direction corresponding to the reflection surface of the first reflector.

17. The directional backlight unit of claim 16, further comprising a light diffuser configured to widely diffuse the light, emitted from the light source, in the lateral direction,
wherein the light diffuser is disposed between the light source and the second reflector, and widely diffuses the light, emitted from the light source, in the lateral direction to allow the light to pass through the through hole.

* * * * *